United States Patent [19]

Wilson et al.

[11] Patent Number: 4,738,820

[45] Date of Patent: Apr. 19, 1988

[54] NUCLEAR FUEL ASSEMBLY BOTTOM NOZZLE ATTACHMENT SYSTEM ALLOWING RECONSTITUTION

[75] Inventors: John F. Wilson, Murrysville, Pa.; Robert K. Gjertsen, Columbia, S.C.

[73] Assignee: Westinghouse Electric Corp., Pittsburgh, Pa.

[21] Appl. No.: 933,716

[22] Filed: Nov. 21, 1986

[51] Int. Cl.[4] .............................................. G21C 3/32
[52] U.S. Cl. .................................. 376/446; 376/434; 376/443
[58] Field of Search ............... 376/446, 434, 443, 440, 376/364, 261, 203

[56] References Cited

U.S. PATENT DOCUMENTS

| | | |
|---|---|---|
| 2,836,918 | 6/1958 | Pula et al. . |
| 2,850,934 | 9/1958 | Sehn . |
| 3,267,000 | 8/1966 | Ashcroft et al. . |
| 3,329,057 | 7/1967 | Salz . |
| 3,389,056 | 6/1968 | Frisch . |
| 3,791,466 | 2/1974 | Patterson et al. . |
| 3,909,907 | 10/1975 | Davis . |
| 3,997,394 | 12/1976 | Aisch et al. . |
| 4,076,586 | 2/1978 | Bideau et al. . |
| 4,242,932 | 1/1981 | Barmore . |
| 4,314,885 | 2/1982 | Edwards et al. . |
| 4,323,428 | 4/1982 | Schallenberger et al. . |
| 4,480,513 | 11/1984 | McCanley et al. . |
| 4,522,780 | 6/1985 | Shallenberger et al. . |
| 4,560,532 | 12/1985 | Barry et al. . |
| 4,572,816 | 2/1986 | Gjertsen et al. . |
| 4,585,613 | 4/1986 | Styskal et al. . |
| 4,603,027 | 7/1986 | Wilson et al. . |
| 4,618,472 | 10/1986 | Gjertsen .............................. 376/446 |

OTHER PUBLICATIONS

Abandoned U.S. patent application Ser. No. 186,937 filed Sep. 12, 1980 to John M. Shallenberger and Stephen J. Ferlan for Reconstitutable Fuel Assembly for a Nuclear Reactor incorporated by reference into U.S. Pat. No. 4,522,780.

Primary Examiner—Donald P. Walsh

[57] ABSTRACT

A nuclear reactor fuel assembly bottom nozzle to guide thimble attachment system and method allowing bottom nozzle removal and replacement without inverting the fuel assembly. At manufacture, a bottom-insertable, two-headed bolt secures the bottom nozzle adaptor plate to the guide thimble bottom end plug. The two-headed bolt is unthreadable in the guide thimble from the top of the upright fuel assembly. At reconstitution, a top-insertable bolt fastener secures the replacement or original bottom nozzle adaptor plate to the guide thimble bottom end plug. The bolt fastener is inserted in the guide thimble from the top of the upright fuel assembly. The bolt fastener is unthreadable in the guide thimble from the top of the upright fuel assembly for a second reconstitution. Less preferably, the bolt fastener also can be used for original manufacture (in place of the two-headed bolts previously discussed).

11 Claims, 2 Drawing Sheets

NUCLEAR FUEL ASSEMBLY BOTTOM NOZZLE ATTACHMENT SYSTEM ALLOWING RECONSTITUTION

CROSS REFERENCE TO RELATED APPLICATIONS

Reference is hereby made to the following copending applications dealing with related subject matter and assigned to the assignee of the present invention:

1. "Nuclear Reactor" by H. M. Ferrari et al, assigned U.S. Ser. No. 732,220 and filed May 9, 1985 (W. E. 52,520).

BACKGROUND OF THE INVENTION

1. Field of the Invention

The present invention relates generally to fuel assemblies for nuclear reactors and, more particularly, is concerned with a nuclear fuel assembly bottom nozzle to control rod guide thimble attachment system which allows for bottom nozzle fuel assembly reconstitution.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission. The reactor also has control rods which can be inserted into the guide thimbles to control the fission reaction. The fission reaction releases a large amount of energy in the form of heat. A liquid coolant is pumped upwardly through the core in order to extract some of the heat generated in the core for the production of useful work.

During operation in the nuclear reactor, the fuel rods may occasionally develop cracks along their lengths resulting primarily from internal stresses. These defective fuel rods must be replaced in the fuel assemblies, and this replacement must occur under water as the fuel assemblies become highly radioactive during their operation in the reactor. To gain access to a defective fuel rod, it is necessary to remove the top and/or bottom nozzle of the fuel assembly. Reconstitutable fuel assemblies exist which are designed with removable nozzles. Typical removable top nozzles have been attached to the top of the guide thimbles using a threaded or bulge/-groove arrangement. Typical removable bottom nozzles have been attached to the bottom of the guide thimbles using a threaded arrangement. Heretofore, bottom nozzle removal and replacement has required inverting the fuel assembly, such as disclosed in U.S. Pat. No. 4,522,780, hereby incorporated by reference. There is a concern that inverting an irradiated fuel assembly may damage the fuel pellets in the fuel rods.

SUMMARY OF THE INVENTION

The present invention provides a nuclear fuel assembly with an improved attaching arrangement for the removal and replacement of its bottom nozzle without inverting the fuel assembly.

Briefly stated, a first embodiment of the invention is directed towards a nuclear fuel assembly bottom nozzle adaptor plate is attached to the guide thimble bottom end plug with a two-headed bolt. The bolt has a first head large enough to be blocked by the adaptor plate's bore, and has a second head small enough to pass through the bore and the bottom end plug's threaded axial passageway. The bolt is threaded to the bottom end plug. The first head is located near the adaptor plate, and the second head is located near the end plug.

In a second embodiment of the invention, involving a nuclear fuel assembly bottom nozzle to guide thimble attachment system, the bottom nozzle adaptor plate is attached to the guide thimble bottom end plug with a bolt fastener. The bolt fastener has a head large enough to be blocked by the end plug's axial passageway. The bolt fastener is threaded to the adaptor plate. The head is located near the end plug.

In a third embodiment of the invention, there is disclosed a method to reconstitute a nuclear fuel assembly which has its bottom nozzle attached by the two-headed bolts of the first embodiment previously discussed. In the method, the fuel assembly is placed with its top nozzle higher than its bottom nozzle, and the bolts are unthreaded from the top. The unthreaded bolts are removed from the bottom, and the bottom nozzle is removed. A lower nozzle is obtained in which the adaptor plate has a threaded bore. Bolt fasteners, of the second embodiment previously discussed, are inserted through the guide thimbles from the top, through the end plugs and into the threaded bore of the adaptor plate.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may thus be understood by reference to the following description taken in connection with the accompanying drawings, in which:

DETAILED DESCRIPTION OF THE INVENTION

Figure 1:
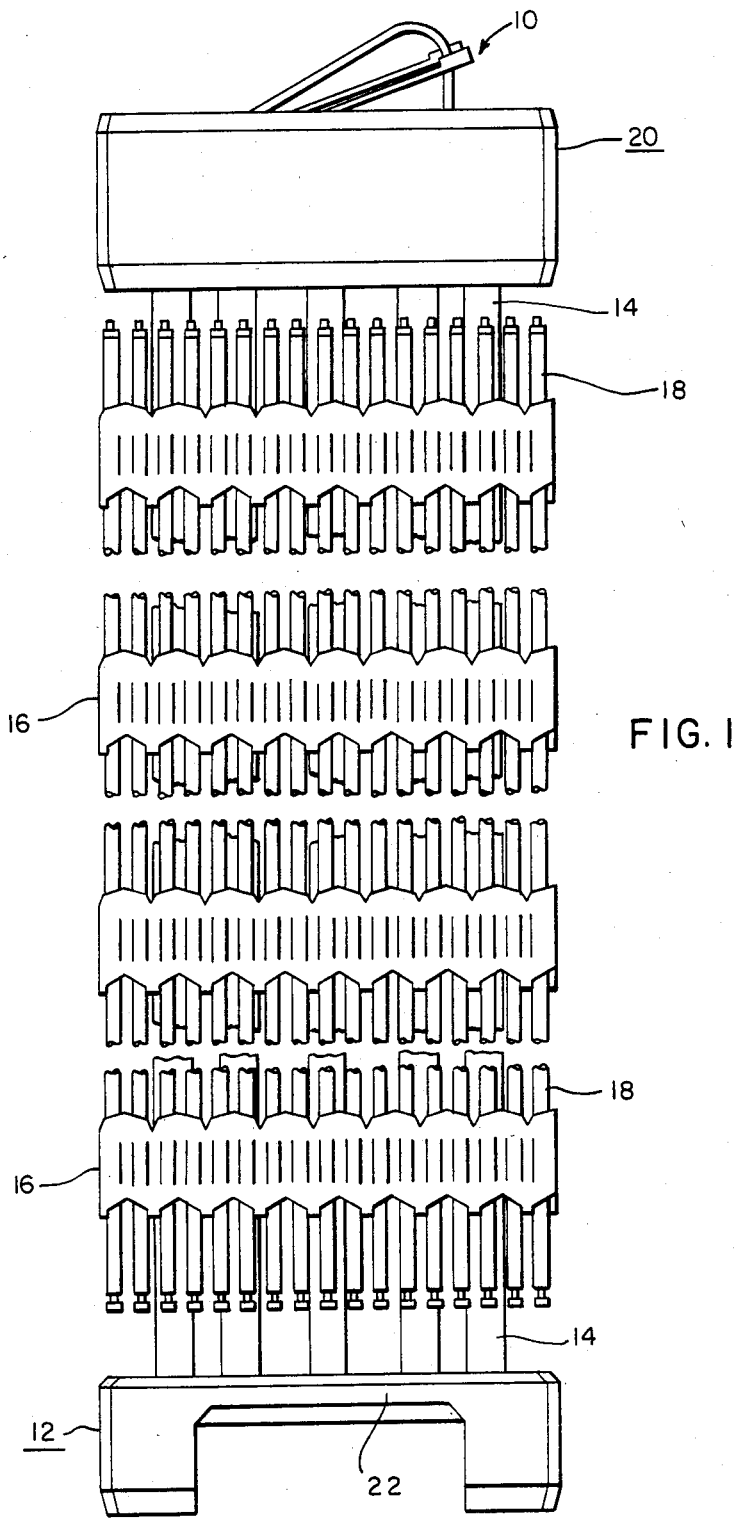
FIG. 1 is an elevational view of a nuclear fuel assembly which incorporates, before reconstitution, the bottom nozzle to guide thimble attachment arrangement of the present invention and which incorporates, after reconstitution, the lower nozzle to guide thimble attachment arrangement of the present invention.

Reference will now be made in detail to several present preferred embodiments of the invention, an example of which is illustrated in the accompanying drawings. In the drawings, like reference characters designate like or corresponding parts throughout the several views.

In FIG. 1, a (typically 13.5 foot long) nuclear fuel assembly 10 is shown in vertically foreshortened form. The fuel assembly 10 is the type used in a pressurized water reactor (PWR) and basically includes a bottom (or lower) nozzle 13 for supporting the assembly on the lower core plate (not shown) in the core region of a nuclear reactor (not shown), and a number (typically 24) of longitudinally extending (typically 12 foot long) guide thimbles 14 which project upwardly from the bottom (or lower) nozzle 12. The fuel assembly 10 further includes a plurality of transverse grids 16 axially spaced along the guide thimbles 14 and an organized array of elongated fuel rods 18 transversely spaced and supported by the grids 16. Also the assembly has a top nozzle 20 attached to the upper ends of the guide thimbles 14. The lower ends of the guide thimbles 14 are attached to the adaptor plate 22 of the bottom (or lower) nozzle 12. In this region, each guide thimble 14 typically is surrounded by a grid sleeve (not shown). With such an arrangement of parts, the fuel assembly 10 forms an integral unit capable of being conventionally handled without damaging the assembly parts.

As mentioned above, the fuel rods 18 in the fuel assembly 10 are held in spaced relationship with one another by the grids 16 spaced along the fuel assembly length. Typically each fuel rod 18 contains nuclear fuel pellets of uranium dioxide (not shown). A liquid moderator/coolant, such as water or water containing boron, is pumped upwardly through the guide thimbles 14 and along the fuel rods 18 of the fuel assembly 10 in order to extract heat generated therein for the production of useful work. To control the fission process, a number of control rods (not shown) are reciprocally movable in the guide thimbles 14 located at predetermined positions in the fuel assembly 10.

In FIG. 1, a nuclear reactor fuel assembly bottom nozzle to guide thimble attachment system is shown for a first embodiment of the apparatus of the invention, in which a bottom-insertable, two-headed bolt 24 is used for the attachment. By "bottom-insertable" is meant insertable from the bottom of the fuel assembly. The bottom nozzle adaptor plate 22a has a bore 26. The lower end of the guid thimble 14 has an attached (e.g. welded) bottom end plug 28. The bottom end plug 28 has a threaded axial passageway 30 which is aligned with the bottom nozzle adaptor plate's bore 26.

Figure 2:
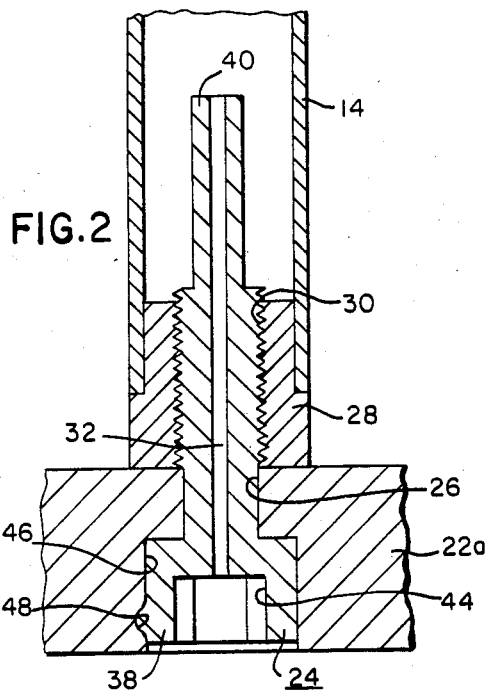
FIG. 2 is an enlarged detailed elevational view, in section, of a fragmentary portion of the bottom nozzle area of FIG. 1 before reconstitution, showing one guide thimble attached to the bottom nozzle adaptor plate using the two-headed bolt of the invention.
Figure 3:
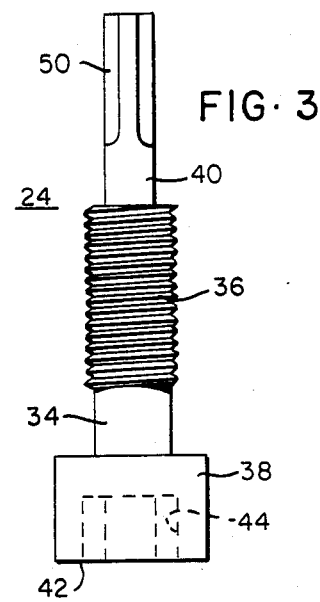
FIG. 3 is an enlarged elevational view of the two-headed bolt of FIG. 2.

The two-headed bolt 24, seen in FIGS. 2 and 3, has a longitudinal flow hole 32 to allow passage of coolant. The shank portion 34 has a threaded section 36. The first head 38 is sized to block passage through the bore 26, while the second head 40 is sized to allow passage through the bore 26 and the passageway 30. The two-headed bolt 24 is placed in the bore 26 and threadably inserted in the passageway 30. The first head 38 is proximate the bottom nozzle adaptor plate 22a while the second head 40 is proximate the guide thimble bottom end plug 28. By that is meant the second head 40 faces in the direction of the top nozzle 20.

Typically, the two-headed bolt is installed at the time of fuel assembly original manufacture. The fuel assembly skeleton typically is assembled on its side at the fuel plant. Since the fuel assembly has not been irradiated yet in a nuclear reactor, there is no need to do this assembly work under water, and there is no problem gaining access to the bottom nozzle attachment area of the fuel assembly.

The first head can be any standard bolt head, but a preferred first head 38 has a face 42 that includes a polygonal-shaped recess 44. In an exemplary arrangement, the bore 26 includes a countersunk bore portion 46 which surrounds the first head 38 and which has a detent 48 into which the first head 38 is crimp-locked to prevent loosening.

The second head can be any standard bolt head, but a preferred second head 40 has a plurality of longitudinally-extending, peripheral, generally flat surfaces 50. In this case the second head would extend above the bottom end plug far enough for a socket wrench (for example), acting from above, to unthread the two-headed bolt. It is noted that if the second head 40 had a wrenching feature that was a polygonal-shaped recess, then it would not have to extend above the bottom end plug to be unthreaded by an allen wrench (for example) acting from above.

The two-headed bolt 24 arrangement allows for bottom insertion during manufacture to attach the bottom (or lower) nozzle 12 to the guide thimbles 14. Presently, single-headed bolts or screws are bottom inserted for this attachment. The two-headed bolt 24 arrangement allows for top unthreading to detach the bottom (or lower) nozzle 12 from the guide thimbles 14 without having to invert the fuel assembly 10. Presently, the fuel assembly must be inverted for this detachment. Such disassembly work on an irradiated fuel assembly must be done under water.

The bottom nozzle of an irradiated fuel assembly may be removed as one of the steps during a fuel assembly reconstitution procedure or during a spent fuel rod consolidation procedure. Hence, in these cases, the two-headed bolt 24 arrangement allows for fuel assembly reconstitution or spent fuel rod consolidation without inverting the fuel assembly.

To remove the bottom nozzle 12 from the guide thimbles 14 of the fuel assembly 10, the fuel assembly 10 is placed in a generally upright position, or at least with its top nozzle 20 higher than its bottom nozzle 12. Then, a long-handled wrench is inserted into each guide thimble 14, from the top nozzle 20 towards the bottom nozzle 12, and into engagement with the second head 40 of the two-headed bolt 24. It is noted that the wrench can enter the guide thimble as easily as can a control rod and removal of the top nozzle is not required. The wrench is used to overcome any crimp-lock and unthread the two-headed bolt 24 which will fall away. When all the two-headed bolts are thus removed, the bottom nozzle 12 will fall away. Typically, such work occurs on an upright fuel assembly suspended underwater in the spent fuel pit of the nuclear reactor, with a laterally-movable tray or bucket placed beneath the fuel assembly to collect the deattached two-headed bolts 24 and the detached bottom (or lower) nozzle 12.

The top nozzle 20 is removed by methods known to those skilled in the art, such methods forming no part of this invention. Typically, the spent fuel rods 18 are pushed out the bottom of the fuel assembly skeleton and are consolidated into containers. In the case of removed defective fuel rods, the replacement fuel rods are pulled into the fuel assembly skeleton from the bottom for fuel assembly reconstitution. Pulling fuel rods into the fuel assembly skeleton from the bottom also is a preferred method of original fuel assembly manufacture and avoids the problem of top loading of fuel rods where the advancing rod impinges on a mixing vane grid damaging the vane and/or scratching the rod.

Figure 4:
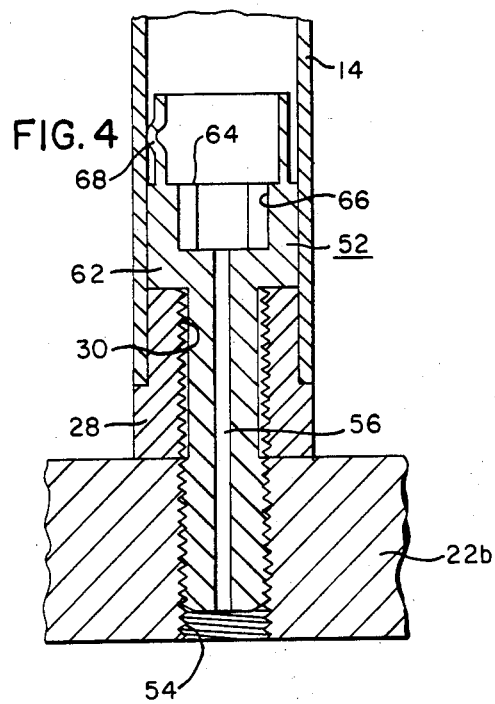
FIG. 4 is an enlarged detailed elevational view, in section, of a fragmentary portion of the bottom nozzle area of FIG. 1 after reconstitution, showing one guide thimble attached to the lower nozzle adaptor plate using the bolt fastener of the invention.

In FIG. 4, a nuclear reactor fuel assembly bottom nozzle to guide thimble attachment system is shown for a second embodiment of the apparatus of the invention, in which a top-insertable bolt fastener 52 is used for the attachment. By "top-insertable" is meant insertable from the top of the fuel assembly. The bottom nozzle adaptor plate 22b has a threaded bore 54. The lower end of the guide thimble 14 has an attached (e.g. welded) bottom end plug 28. The bottom end plug 28 has an axial passageway 30 which is aligned with the bottom nozzle adaptor plate's bore 54.

Figure 5:
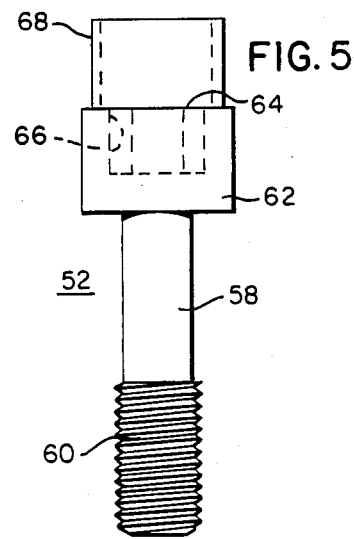
FIG. 5 is an enlarged elevational view of the bolt fastener of FIG. 4.

The bolt fastener 52, seen in FIGS. 4 and 5, has a longitudinal flow hole 56 to allow passage of coolant. The shank portion 58 has a threaded section 60. The head 62 is sized to block passage through the passageway 30. The bolt fastener 52 is placed in the passageway 30 and threadably inserted in the bore 54. The head 62 is located in the guide thimble 14 proximate the guide thimble bottom end plug 28. By that is meant the head 62 faces in the direction of the top nozzle 20.

Typically, the bolt fastener is installed underwater on an upright irradiated fuel assembly at the time of fuel assembly reconstitution. However, it is possible to install the bolt fastener arrangement at the time of fuel assembly original manufacture (in place of the two-headed bolts previously discussed).

The head 62 can be any standard bolt head, but a preferred head 62 has a face 64 that includes a polygonal-shaped recess 66. In an exemplary arrangement, the head has a locking cut 68 which is crimped-locked to the inside wall of the guide thimble 14 to prevent loosening.

The bolt fastener 52 arrangement allows for top insertion during reconstitution to attach the bottom (or lower) nozzle 12 to the guide thimbles 14. Presently, bolts or screws are bottom inserted for this attachment. The bolt fastener 52 arrangement allows for top threading to attach the bottom (or lower) nozzle 12 to the guide thimbles 14 without having to invert the fuel assembly 10. Presently, the fuel assembly must be inverted for this attachment. Such assembly work on an irradiated fuel assembly must be done under water.

The bottom (or lower) nozzle may be attached to an irradiated fuel assembly as one of the steps during a fuel assembly reconstitution procedure after the defective fuel rods have been exchanged for replacement fuel rods. Hence, in this case, the bolt fastener 52 arrangement allows for fuel assembly reconstitution without inverting the fuel assembly.

To attach the bottom (or lower) nozzle 12 to the guide thimbles 14 of the fuel assembly 10, the fuel assembly 10 is placed in a generally upright position, or at least with its top nozzle 20 higher than its bottom nozzle 12. A bottom (or lower) nozzle 12 is obtained wherein the bottom nozzle adaptor plate 22b has a plurality of threaded bores 54. Then, a long-handled wrench, detachable holding the bolt fastener 52, is inserted into each guide thimble 14 from the top nozzle 20 towards the bottom (or lower) nozzle 12. It is noted that the wrench can enter the guide thimble as easily as can a control rod and this step can be performed with the top nozzle 20 attached. The wrench is used to thread the bolt fastener 52 and then is detached therefrom. When all the bolt fasteners 52 are thus threaded (and crimp-locked, as desired), the bottom (or lower) nozzle 12 will be secured.

The bottom (or lower) nozzle 12 used during the reconstitution may be the previously-removed bottom nozzle of, for example, original manufacture or a replacement bottom nozzle providing the adaptor plate has threaded bores.

It is noted that if the adaptor plate 22a of the two-headed bolt 24 of FIG. 2 had a threaded bore, then the area of the shank 34 of the two-headed bolt 24 surrounded by such threaded bore would itself be without threads. Similarly, where the guide thimble bottom end plug of original manufacture has a threaded axial passageway (see FIG. 2), the bolt fastener 52 of the reconstituted fuel assembly would have a shank 58 in which the area of the shank 58 surrounded by such threaded axial passageway would itself be without threads (see FIG. 4). Of course, if the bolt fastener 52 were used for original manufacture, as well as for reconstitution, then the guide thimble bottom end plug's axial passageway would not be threaded.

It is noted that with the above-described invention, the attachment system allows for a second, third, or any number of reconstitutions of the fuel assembly.

It will be apparent that many modifications and variations are possible in light of the above teachings. It, therefore, is to be understood that within the scope of the appended claims, the invention may be practiced other than as specifically described.

We claim:

1. A nuclear reactor fuel assembly having a bottom nozzle to guide thimble attachment system comprising:
   (a) a bottom nozzle with an adaptor plate having a bore;
   (b) a guide thimble with a bottom end plug having a threaded axial passageway, said passageway aligned with said bore; and
   (c) a top-unthreadable two-headed bolt with a longitudinal flow hole, a shank having a threaded section, a first head sized to block passage through said bore, and a second head sized to allow passage through said bore and said passageway, said two-headed bolt disposed in said bore and threadably disposed in said passageway with said first head proximate said adaptor plate and said second head proximate said end plug.

2. The nuclear reactor fuel assembly of claim 1, wherein the face of said first head, of said two-headed bolt, includes a polygonal-shaped recess.

3. The nuclear reactor fuel assembly of claim 1, wherein said second head, of said two-headed bolt, has a plurality of longitudinally-extending, peripheral, generally flat surfaces.

4. The nuclear reactor fuel assembly of claim 1, wherein said bore, in said adaptor plate of said bottom nozzle, includes a countersunk bore portion surrounding said first head.

5. The nuclear reactor fuel assembly of claim 4, wherein said countersunk bore portion has a detent and said first head, of said two-headed bolt, is crimp-locked in said detent.

6. The nuclear reactor fuel assembly of claim 5, wherein the face of said first head, of said two-headed bolt, includes a polygonal-shaped recess and wherein said second head, of said two-headed bolt, has a plurality of longitudinally-extending, peripheral, generally flat surfaces.

7. A nuclear reactor fuel assembly having a bottom nozzle to guide thimble attachment system comprising:

(a) a bottom nozzle with an adaptor plate having a threaded bore;

(b) a guide thimble with a bottom end plug having an axial passageway, said passageway aligned with said bore; and (c) a top-insertable bolt fastener with a longitudinal flow hole, a shank having a threaded section, and a head sized to block passage through said passageway, said bolt fastener disposed in said passageway and threadably disposed in said bore with said head disposed in said guide thimble proximate said end plug.

8. The nuclear reactor fuel assembly of claim 7, wherein the face of said head, of said bolt fastener, includes a polygonal-shaped recess.

9. The nuclear reactor fuel assembly of claim 8, wherein said head, of said bolt fastener, includes a locking cup crimp-locked to said guide thimble.

10. A method for bottom-nozzle reconstituting a nuclear reactor fuel assembly having a top nozzle and having its guide thimbles attached to its bottom nozzle with bottom-insertable two-headed bolts, said bolts threaded to the bottom end plugs of said guide thimbles, said method comprising the following steps:

(a) disposing said fuel assembly with said top nozzle higher than said bottom nozzle;

(b) unthreading said two-headed bolts from the top;

(c) removing said bottom nozzle;

(d) obtaining a lower nozzle with an adaptor plate having a plurality of threaded bores; and (e) inserting bolt fasteners through said guide thimbles from the top, into said end plugs, and threadably into said bores.

11. The method of claim 10, wherein said fuel assembly disposing step includes disposing said fuel assembly in a generally upright position.

* * * * *